US009608926B2

(12) United States Patent
Suzuki et al.

(10) Patent No.: US 9,608,926 B2
(45) Date of Patent: Mar. 28, 2017

(54) FLEXIBLE RECIRCULATION BANDWIDTH MANAGEMENT

(71) Applicant: Cisco Technology, Inc., San Jose, CA (US)

(72) Inventors: Hiroshi Suzuki, Palo Alto, CA (US); Surendra Anubolu, Fremont, CA (US); Andrew Michael Robbins, Austin, TX (US); Stephen Francis Scheid, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 231 days.

(21) Appl. No.: 14/473,449

(22) Filed: Aug. 29, 2014

(65) Prior Publication Data

US 2016/0065484 A1    Mar. 3, 2016

(51) Int. Cl.
*H04L 12/873* (2013.01)
*H04L 12/863* (2013.01)

(52) U.S. Cl.
CPC .......... *H04L 47/522* (2013.01); *H04L 47/623* (2013.01)

(58) Field of Classification Search
CPC ..... H04L 47/32; H04L 49/90; H04L 12/5693; H04L 47/623; H04L 47/6255; H04L 47/6275
See application file for complete search history.

(56) References Cited

U.S. PATENT DOCUMENTS

| 7,551,617 | B2 | 6/2009 | Etherton et al. |
| 8,571,024 | B2 | 10/2013 | Tatar et al. |
| 2006/0274773 | A1* | 12/2006 | Cohen ..................... H04L 47/32 370/413 |
| 2008/0080382 | A1* | 4/2008 | Dahshan ............. H04L 12/5693 370/235 |
| 2012/0155256 | A1* | 6/2012 | Pope ..................... G06F 13/128 370/230 |

* cited by examiner

*Primary Examiner* — David Oveissi
(74) *Attorney, Agent, or Firm* — Meunier Carlin & Curfman LLC

(57) ABSTRACT

A method for managing recirculation path traffic in a network node comprises monitoring an input packet stream received at an input port of the network node and monitoring a recirculation packet stream at a recirculation path of the network node. A priority level associated with individual packets of the monitored input packet stream is detected and low priority packets are stored in a virtual queue. The method also includes determining an average packet length associated with packets of the monitored recirculation packet stream. The method further comprises queuing one or more of the low priority packets or the recirculation packets for transmission based on the average packet length and a weighted share schedule.

18 Claims, 5 Drawing Sheets

FLEXIBLE RECIRCULATION BANDWIDTH MANAGEMENT

TECHNICAL FIELD

The present disclosure relates generally for managing resources in a piece of network equipment and, more particularly, to systems and methods for flexibly allocating bandwidth between recirculated packets and ingress port traffic.

BACKGROUND

In most network routing/switching equipment, the amount of time required to process packets can vary. For example, packets can arrive as fragments or arrive out of order on different links. The packets or packet fragments may be buffered while waiting for other packets or packet fragments to arrive. The amount of time required to process a packet after the packet segments have arrived can also vary depending on what feature set is enabled. Other examples of various amount of packet processing includes packet encapsulation and/or de-capsulation for tunneling features, packet encryption/decryption for security processing, packet content matching across multiple packets in individual packet flows, and applying various access control/QOS enforcements based on individual policies. These different processing features, which apply to individual packets, may require different amounts of processing time.

In conventional routing equipment, large latency periods during this variable processing time can create backups in packet queues and eventually cause packet drops. Some of the dropped packets may be control packets used for maintaining network links. Other dropped packets might affect packet prioritization. For example, some of the dropped packets may have higher quality of service values than other packets. Unfortunately, the arriving packets may be indiscriminately dropped before the packet processor has a chance to take into account associated control or QoS information.

One solution for minimizing dropped packets is to dedicate a large amount of memory on the ingress path for buffering packets that are waiting on other packets or packets that require additional processing before being transmitted. As such, most of the ingress traffic is essentially delayed while certain packets await additional data or undergo additional processing. In some cases, certain high-priority traffic is allowed to "skip" the certain delayed packets to ensure that QoS is maintained for some high-priority data. Although packet buffering schemes can be more reliable than dropping packets, it tends to add costs, both monetary and computational.

Another solution involves using a parallel processing path, referred to as a "recirculation" path, which allows packets that need additional processing to be processed by a parallel processing scheme and "recirculated" back for queuing with the ingress network port traffic. However, in order to maintain the quality of ingress traffic service, recirculation traffic is typically allocated only a relatively small amount of guaranteed bandwidth. Also usually recirculation path traffic are given lower priority than ingress traffic. This can result is even longer delays (and even drops) in the recirculation path for processing various packet processing features

DESCRIPTION OF EXAMPLE EMBODIMENTS

Overview

Figure 1:
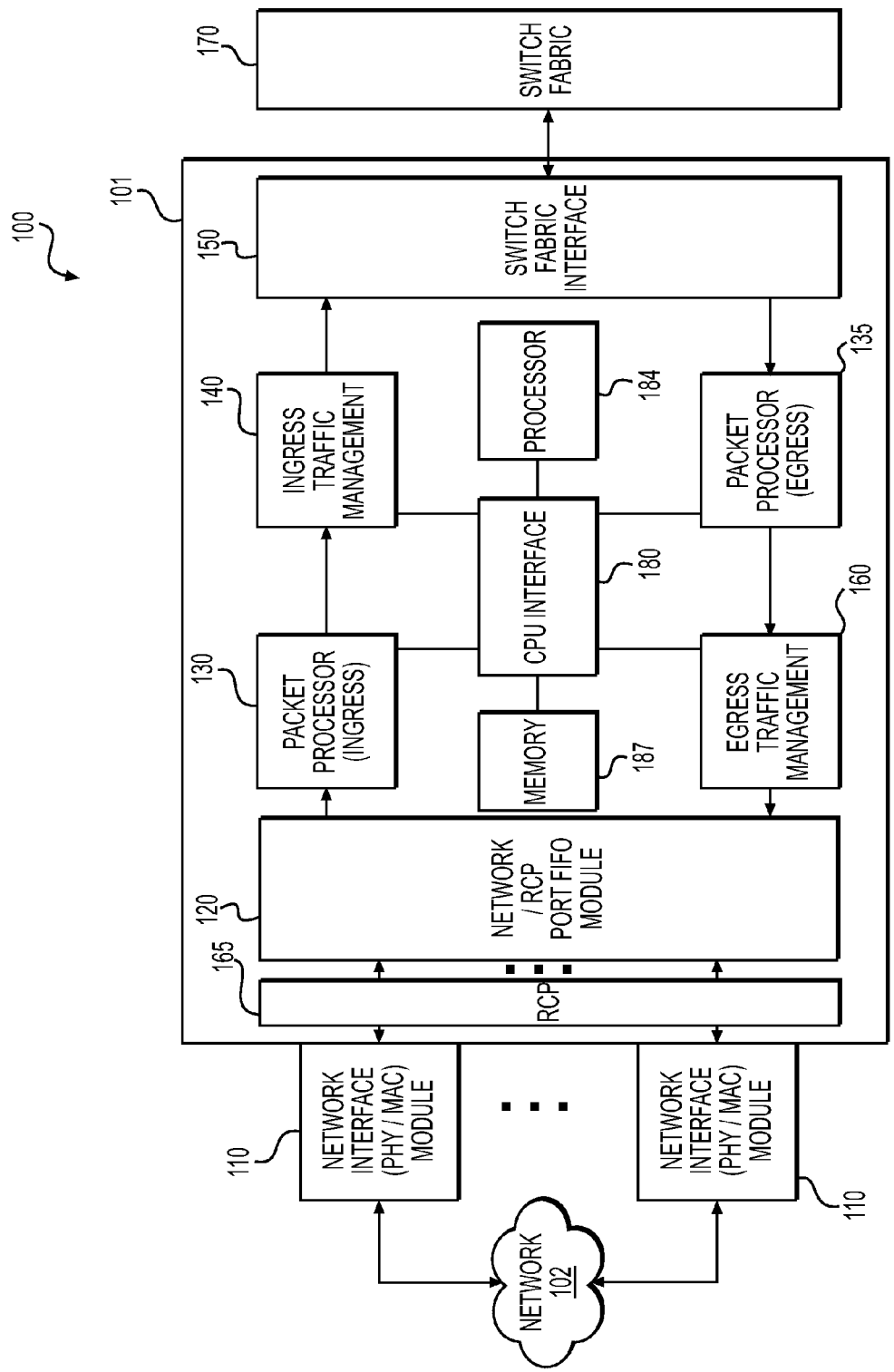
FIG. 1 is a block diagram of an exemplary network environment in which systems and methods associated with certain disclosed embodiments may be implemented.

In accordance with one aspect, the present disclosure is directed to a method for managing recirculation path traffic in a network node. The method may comprise monitoring an input packet stream received at an input port of the network node and monitoring a recirculation packet stream at a recirculation path of the network node. A priority level associated with individual packets of the monitored input packet stream may be detected, and low priority packets may be stored in a virtual queue. An average packet length associated with packets of the monitored recirculation packet stream may be monitored. The method may further comprise queuing one or more of the low priority packets or the recirculation packets for transmission based on the average packet length and a weighted share schedule.

According to another aspect, the present disclosure is directed to a network switch device, comprising an input port for receiving an input packet stream and a recirculation path for conveying a recirculation packet stream. The system may also comprise a memory module coupled to the input port and the recirculation path, the memory module comprising a high-priority virtual queue, a low-priority virtual queue, and a virtual recirculation queue for storing respective high-priority, low-priority, and recirculation packets. The system may further comprise a processor, communicatively coupled to the memory module, the input port, and the recirculation path. The processor may be configured to monitor the input packet stream and monitor the recirculation packet stream. The processor may also be configured to detect a priority level associated with individual packets of the monitored input packet stream and store low priority packets in the low-priority virtual queue. The processor may be further configured to determine an average packet length associated with packets of the monitored recirculation packet stream. The system may also include a scheduling module, communicatively coupled to the memory. The scheduling module may be configured to queue one or more of the low priority packets or the recirculation packets for transmission based on the average packet length and a weighted share schedule.

In accordance with yet another aspect, the present disclosure is directed to a computer-readable medium for use on a computer system, the computer-readable medium including computer-executable instructions for causing the computer system to perform a method for managing recirculation path traffic in a network node. The method may comprise monitoring an input packet stream received at an input port of the network node and monitoring a recirculation packet stream at a recirculation path of the network node. A priority level associated with individual packets of the monitored input packet stream may be detected, and low priority packets may be stored in a virtual queue. An average packet length associated with packets of the monitored recirculation packet stream may be monitored. The method may further comprise queuing one or more of the low priority packets or the recirculation packets for transmission based on the average packet length and a weighted share schedule.

Example Embodiments

FIG. 1 is a simplified block diagram illustrating an exemplary architecture 100 according to one embodiment of the present invention. The network device architecture 100 may a network device 101 that includes distinct receive and transmit data paths. The receive and transmit data paths are independent and can operate on a stream of packets received from network 102 or from switch fabric 170, respectively. The receive side data path is defined as a path from one of a plurality of network interface (PHY/MAC) modules 110 to the routing device's switch fabric 170. A transmit side data path is a path from the switch fabric 170 to a network interface (PHY/MAC) module 110.

In the illustrated embodiment, data packets are received from network 102 through a network interface (PHY/MAC) module 110. A network interface (PHY/MAC) module 110 can be configured to couple to a variety of hardware and network protocols in network 102 such as GE/10GE/40GE and 100GE. A network interface (PHY/MAC) module 110 comprises one or more physical interfaces to the network and is configured to perform operations, such as physical layer processing. Network interface (PHY/MAC) module 110 coupled to network device 101 can be configured to both receive and transmit packets. Network interface (PHY/MAC) modules 110 can also perform tasks such as VLAN-based filtering and accounting on ingress packets, or even truncation of L2 headers not needed by network device for processing.

A plurality of network interface (PHY/MAC) modules 110 are coupled to network device 101 via network/RCP port FIFO module 120 where network traffic and RCP traffic merges into the packet ingress processor and diverge from the packet egress processor. Network/RCP port FIFO module 120 can store the incoming packets in a plurality of FIFO memories (not shown) to buffer the packets prior to transmitting them to the next stage of the receive data path. Network/RCP port FIFO module 120 extracts portions of the packets containing information relevant for forwarding and classification. Such forwarding and classification portion of the packets will be referred to as "heads" or "headers" while the remainder of the packet will be referred to as a "tail." A portion of a packet considered to be a header can be configured dependent upon, for example, the type of packets received or chosen switching parameters. Network/RCP port FIFO module 120 can also include in a head a control word providing the original Layer 2 length (before potential truncation by the network interface (PHY/MAC) module 110) and the received channel number of the packet to Ingress Packet Processor 130. Network/RCP port FIFO module 120 then sends interleaved heads and tails from each incoming FIFO memory to Ingress Packet Processor 130 according to a round robin scheme (e.g., a deficit or modified deficit round robin scheme). Network/RCP port FIFO module 120 can support low-latency FIFOs. Network/RCP port FIFO module 120 can also provide backpressure to the shared port adapters as the buffering memory becomes full or in response to a backpressure request from components further down the ingress data path.

Ingress Packet Processor 130 is a pipelined switch comprised of four parallel pipelines (or tiny pipes), wherein each pipe can perform the same series of operations on packet heads. In one embodiment of the present invention, the packet heads are distributed in a cyclic fashion to the four pipes. Each pipeline stage works on a different packet header to perform different tasks. When the operation of each stage is complete, each stage passes its results on to the next stage concurrently. Tails of the packets flow transparently through Ingress Packet Processor 130, bypassing the pipeline stages. If Ingress Packet Processor 130 cannot keep up with the number of incoming heads (due either to downstream backpressure or packet re-circulation), the Ingress Packet Processor can apply a hard backpressure to network/RCP port FIFO module 120. Ingress Packet Processor 130 can also strip the Layer 2 headers from the head and add a buffer header to packets sent downstream. A buffer header (BHDR) can contain information from table lookup results and other stages of the Ingress Packet Processor pipe (e.g., ingress-side queue, egress side queue, output encapsulation type, L3 length, L3 packet start offset, ideal packet buffer size, and identification of whether the packet is multicast or unicast). Ingress Packet Processor 130 can further be configured to recycle packet headers through a tiny pipe for further processing if required.

Ingress Packet Processor 130 provides Ingress Traffic Management module 140 with the heads and tails. Ingress Traffic Management module 140 can perform packet buffering, queue management, ingress traffic shaping, and weighted random early discard packet dropping for queue depth management. Ingress Traffic Management module 140 receives the heads and tails from Ingress Packet Processor 130 and merges them based on the order received at the Ingress Traffic Management module. The Ingress Traffic Management module can then place the merged packet into a queue in preparation for transmission to the switch fabric or be immediately dropped. Packets are pulled out of the queue memory based on the destination to which they are targeted and are placed in an appropriate priority switch interface queuing. The outgoing FIFO can be backpressured from switch fabric interface 150 depending upon congestion of switch fabric 170. Multicast packets will be enqueued to a special set of multicast queues. Embodiments of the Ingress Traffic Management module can also support two or more priorities for unicast and multicast traffic. High priority queue traffic can be mapped to a high priority outgoing FIFO, while low priority queue traffic can be mapped to low priority FIFOs in the switch fabric interface.

Ingress Traffic Management module 140 passes packets to appropriate FIFOs in switch fabric interface 150. In this aspect, the switch fabric interface can fragment the unicast and multicast packets received from the Ingress Traffic Management module into uniformly sized and appropriately identified cells to be transmitted through switch fabric 170. Switch fabric interface 150 can generate requests to a scheduler in switch fabric 170 in preparation for transmitting the encapsulated fragments (cells) to switch fabric 170.

The egress data path in network device 101 extends from switch fabric 170 to network interface (PHY/MAC) module 110 and ultimately to network 102. Cells are directed from switch fabric 170 to a destination line card's switch fabric interface 150.

Switch fabric interface 150 reassembles cells from a plurality of different flows (e.g., unicast, multicast, and multiple priorities of each) simultaneously. Switch fabric interface 150 can also perform cyclic redundancy and sequence numbers checks during reassembly, and will store a full packet in a reassembly memory. The transmit data path is configured to treat unicast and multicast packets distinctly. Switch fabric interface 150 can be configured with distinct multicast versus unicast handshaking schemes to Egress Packet Processor 135 in order to control the amount of packet processing capacity of Egress Packet Processor 135 used by multicast versus unicast. The Egress Packet Processor can handle a fixed number of packets at a time (the number of stages in each tiny pipe multiplied by the number of tiny pipes). To avoid overpopulating the stages with multicast packets, a counter is set which is updated for every multicast packet entering and leaving the Egress Packet Processor. In this manner, it is always known how many multicast packets are being handled at any time. This counter is compared with threshold registers to control the amount of multicast packets admitted into Egress Packet Processor 135. Switch fabric interface 150 can also monitor the full status of the reassembly memory FIFOs in order to generate fabric backpressure signals to switch fabric 170, if necessary. Switch fabric interface 150 will transfer the head and tail of each reassembled packet to Egress Packet Processor 135 using a scheduling scheme which can include a strict priority or deficit round robin among unicast and multicast traffic, but such priorities will be distinct between unicast and multicast transmission. Scheduling of transmission of multicast and unicast traffic is controlled by the above-mentioned handshaking scheme between switch fabric interface 150 and Egress Packet Processor 135.

Egress Packet Processor 135 generally performs similar functions as Ingress Packet Processor 130, plus Egress Packet Processor 135 incorporates additional functions. Egress Packet Processor 135 can perform Layer 2 encapsulation for unicast and multicast packets using the table lookup memory (described in the receive data path). Egress Packet Processor 135 uses thresholds for multicast to request new packets from switch fabric interface 150. Egress Packet Processor 135 is further configured to perform multicast packet replication by recirculating a head through one of the parallel pipes immediately after that head has transited the pipe. Egress Packet Processor 135 works in conjunction with Egress Traffic Management module 160 in generating and assembling multicast packets for transmission as well as unicast packets.

Egress Traffic Management module 160 manipulates unicast heads and tails in a similar fashion as Ingress Traffic Management module 140 by merging the heads and tails and placing the full packet into a queue memory. Egress Traffic Management module 160 also assembles multicast heads and tails. In one embodiment of the present invention, such multicast packet assembly can be performed by merging the first head and tail into a queue memory. As the Egress Traffic Management module receives additional heads (for the multicast packet using the same tail data) from Egress Packet Processor 135, the additional head is stored in a queue memory and associated with a tail pointer that points to the memory location of the tail stored with the first head.

In the exemplary embodiment illustrated in FIG. 1, network/RCP port FIFO module 120 is configured to receive the outgoing packets from Egress Traffic Management module 160 and separate traffic going to network port from traffic to RCP module. Network/RCP port FIFO module 120 can accept the packets destined for physical outbound ports on shared port adapters (SPA) 210 based on a flexible mapping of Egress Traffic Management module 160's ports to physical ports. Such a mapping can be used to associate subinterfaces with physical interfaces corresponding to different types of network protocols or priorities associated with outgoing interfaces. Network/RCP port FIFO module 120 can store the full packets in outgoing FIFO memory channels corresponding to each network interface. Should the outgoing FIFO memories reach a full state, network/RCP port FIFO module 120 can cause a backpressure along the transmit data path to a corresponding queuing hierarchy root in Egress Traffic Management module 160, and can also respond to backpressure signals received from network interface (PHY/MAC) modules 110.

Network interface (PHY/MAC) modules 110 receive the egress packets from network/RCP port FIFO module 120. The shared port adapters can process the egress packets, formatting them appropriately for the hardware and network protocols for network 102. Network interface (PHY/MAC) modules 110 can then transmit the outgoing packets on hardware interfaces coupled to network 101. In this manner, an network interface (PHY/MAC) module 110 can both receive packets from network 102 and transmit packets onto network 102.

In many situations, the amount of time required to process packets can vary. For example, packets can arrive as fragments or arrive out of order on different links. The packets or packet fragments may have to be buffered while waiting for other packets or packet fragments to arrive. The amount of time required to process a packet after it does all arrive can also vary depending on what feature set is enabled. For example, different processing features, such as security processing or QoS processing may require different amounts of processing time.

Large latency periods during this variable time processing can create backups in packet queues and eventually cause packet drops. Some of the dropped packets may be control packets used for maintaining network links. Other dropped packets might affect packet prioritization. For example, some of the dropped packets may have higher quality of service values than other packets. Unfortunately, the arriving packets may be indiscriminately dropped before the packet processor has a chance to take into account associated control or QoS information.

Some of these problems are eliminated, reduced or streamlined by the recirculation path 165 in FIG. 1. This multi-pass processing feature supports a deterministic "arrival processing" pass that performs upfront time-bounded packet processing operations. A second "main processing" pass can then be performed for variable run time, high touch processing. This multi-pass processing also enhances other operations, such providing more sophisticated re-assembly, multi-cast, etc. Recirculation path 165 receives packets from Network/RCP egress port FIFOs in block 120. RCP transmit packets to Network/RCP port ingress FIFOs in block 120. For egress side direction, Network/RCP FIFO module 120 demultiplexes RCP traffic from network traffic, both coming from 160. For ingress side direction, Network/RCP FIFO module 120 multiplex network traffic and RCP traffic and supply multiplexed stream into ingress packet processor 130. When packet processing bandwidth of Ingress Packet processing 130 is limited, Network/RCP port FIFO 120, need flow control so that input to 130 from 120 does not exceed ingress packet processing (130) bandwidth. Conventional scheme is to provide simple strict priority scheduler, which gives priority to network traffic against RCP traffic.

Figure 2:
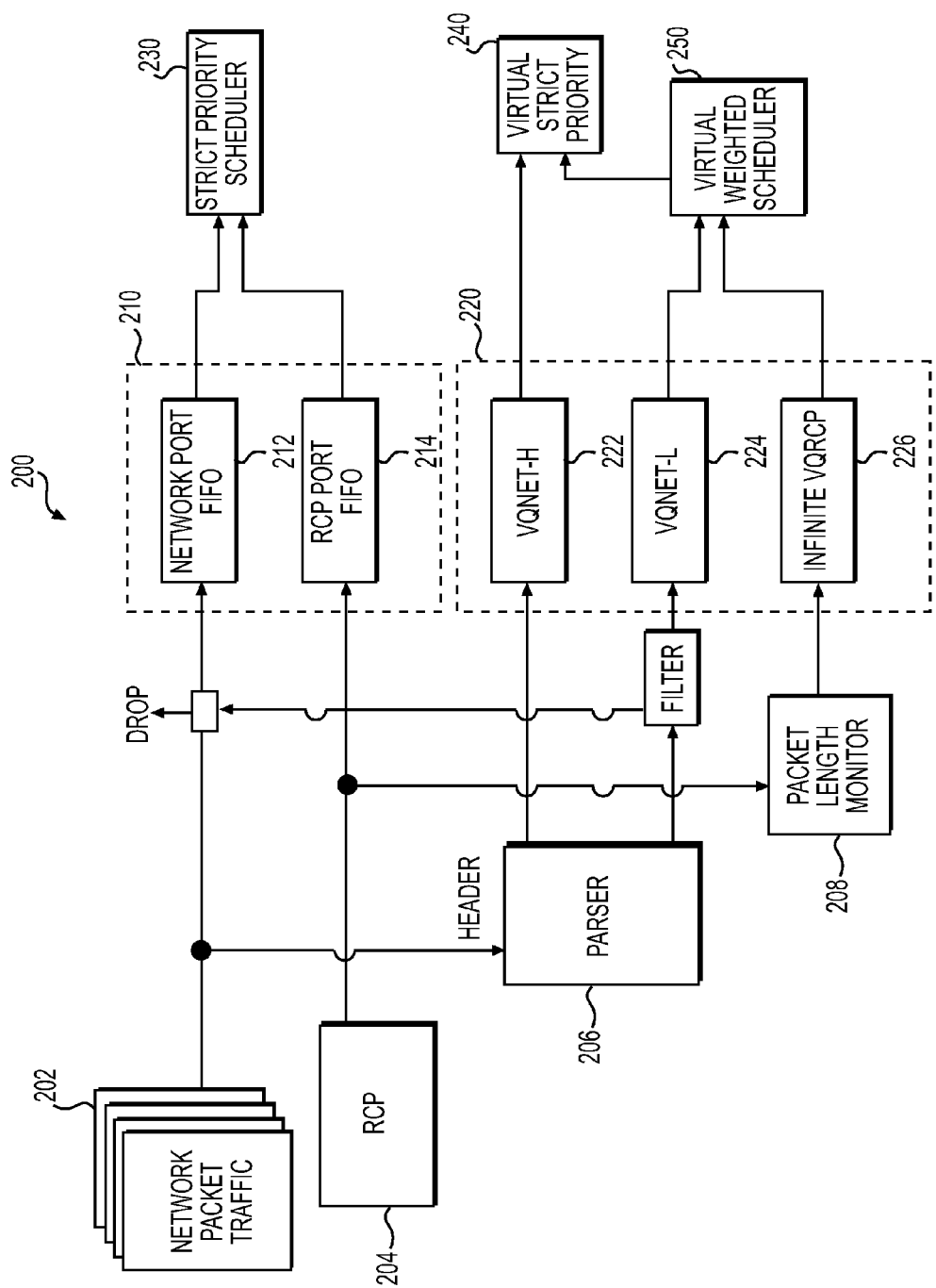
FIG. 2 is a block diagram of an exemplary port schedule scheme ingress network traffic and recirculation path traffic, consistent with certain disclosed embodiments.

FIG. 2 provides a logical diagram of an exemplary port schedule scheme 200 for ingress network traffic and recirculation path traffic, consistent with certain disclosed embodiments. As illustrated in FIG. 2, the logical port scheduling scheme receives ingress network traffic 202 on the input ports of network device 101. Recirculation path (RCP) traffic 204 is also received via a recirculation path. As explained, network device 101 may include physical FIFO queues 210 (including network input port FIFO 212 and recirculation port FIFO 214) that feed a strict priority physical queue 230 that serves egress network ports associated with network device 101. Strict priority queuing ensures that high priority ingress port traffic is given preference over recirculation path traffic to maintain QoS and ingress port throughout.

In addition to physical FIFO queues 210, network device 101 includes virtual queues 220. Virtual queues 220 may include a high priority virtual queue 222, low priority virtual queue 224, and recirculation path virtual queue 226. Virtual schedulers 240, 250 are coupled to virtual queues 220 to queue and feed physical FIFO queues 210 for data transmission.

As illustrated in FIG. 2, strict priority is maintained between ingress network ports FIFO 212 and recirculation path FIFO 214 in physical path. However, the virtual schedulers 240, 250 and virtual queues 220 are added in parallel to the physical path. Virtual queues 220 and schedulers 240, 250 are used to emulate the weighted share scheduling between network port packets and recirculation path packets, but without having physical packet buffering. Using virtual schedulers may provide more bandwidth than min bandwidth to recirculation path by dropping low priority network port traffic.

Network packet traffic 202 received at network ports are copied to ingress parser 206. According to one embodiment, only header information is provided to the parser in order to identify the priority level of the packet. Parser 206 is configured to review the L2/L3 header information to identify low priority packets and high priority packets. This process helps to identify the lower priority packets to be dropped when the allocated bandwidth for ingress network ports is insufficient to accommodate all ingress network ports.

According to one embodiment, virtual queues 220 are embodied as counters which have enqueue process (Qlen and packet length) when each packet arrives at network ports. Virtual queues 220 also have dequeue processes for when virtual scheduler reads the packets from these queues. The virtual queues for network ports hold individual packet length, which are enqueued each time. The virtual scheduler may decrement the queue length by the individual packet length for packet at the top of the virtual queue.

According to one embodiment, the virtual queue 226 for the recirculation path may operate differently from the normal virtual queues as virtual queues for network ports. For example, the virtual recirculation queue 226 may embody a two state machine, with either an idle state or an infinite state. Virtual recirculation queue 226 is idle when the sum of the recirculation path FIFO length and packets held by RCP is less than a threshold value. Otherwise it is infinite. When it is infinite, virtual scheduler can read the packet from the virtual queue for recirculation path.

The average packet length from the virtual queue for recirculation path, which virtual scheduler uses to determine how much bandwidth may be required, is monitored at output of the recirculation path that is input to physical input FIFO by packet length monitor 208. At each interval T, such average packet length for recirculation path is computed and used for the virtual scheduler.

According to one embodiment, the threshold value for the RCP, which is used for the idle vs. infinity determination of the virtual queue state for recirculation path is typically the same or bigger than the monitored average packet length for the recirculation path.

Virtual scheduler 250 serves packets either from virtual queue for network ports and virtual queue for recirculation path with weighted fair share manner. In order to protect high priority packets from network port being dropped, separate virtual queues for low priority virtual queue 224 and high priority queues 222 are coupled to a strict priority scheduler 240. Weighted fair share weights are given to lower priority network virtual queues 224 and virtual queues 226 for recirculation path. When high priority virtual queue 222 or low priority virtual queue 224 exceed a threshold queue length, packet drop signals are generated and low priority packets will be dropped from the network ports.

Figure 3:
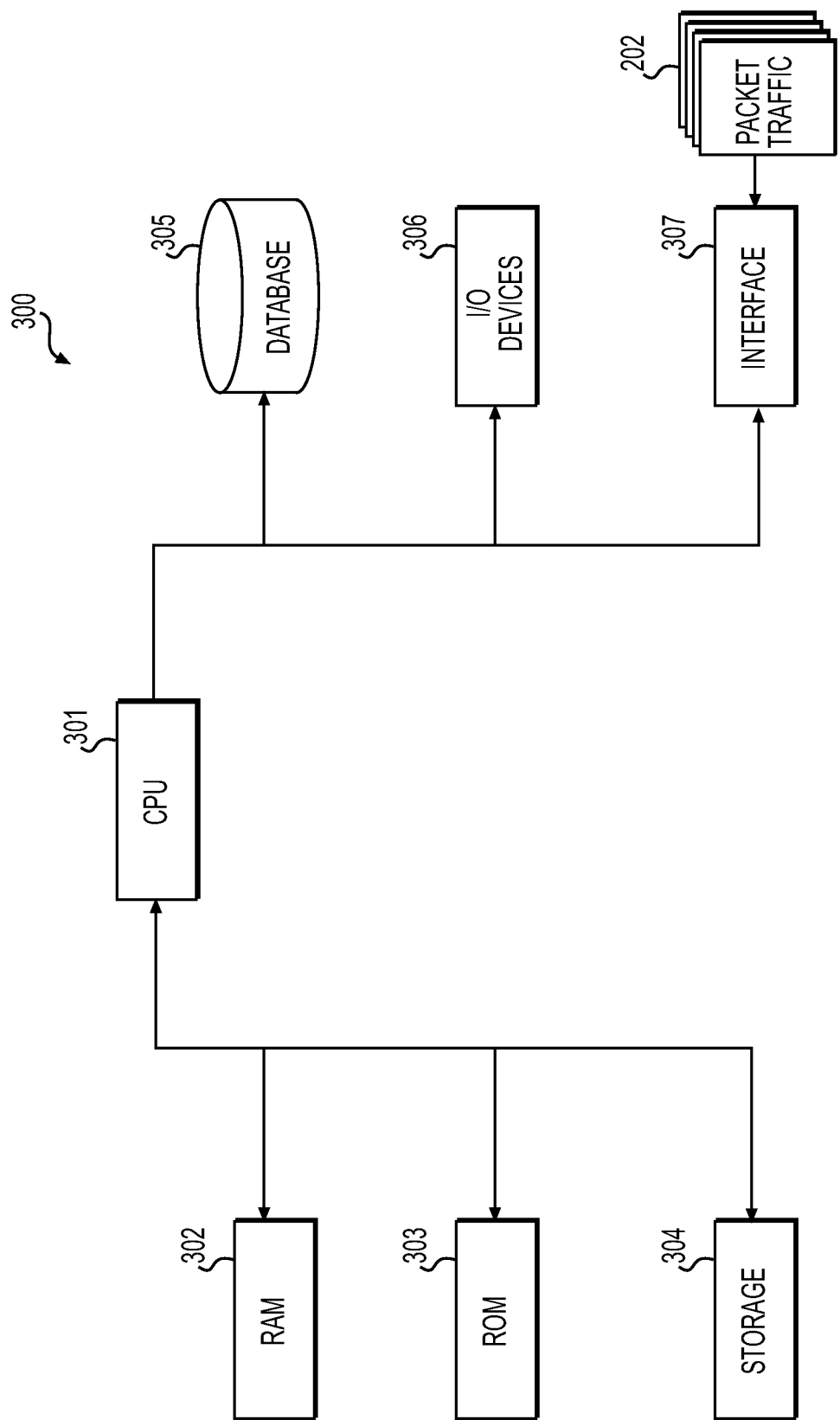
FIG. 3 is a block diagram illustrating certain exemplary components associated with a network device configured for flexible bandwidth management for ingress network traffic and recirculation path traffic, in accordance with certain disclosed embodiments.

FIG. 3 illustrates an exemplary schematic diagram associated with a network node device 101, such as a network switch or network routing device. As explained, network device 101 may include processor-based network switch or routing device that includes its own microcontroller, volatile and non-volatile memory, one or more databases, and one or interfaces for communicating data with other network devices. During operation each of network devices 101 may process ingress network traffic and recirculation path traffic consistent with the disclosed embodiments. Details regarding the processes and methods employed for transmitting ingress network port traffic and recirculation port traffic will be described in greater detail below with respect to flowcharts 400 and 500 of FIGS. 4 and 5, respectively.

According to one embodiment, network device 101 may include one or more hardware components such as, for example, a central processing unit (CPU) or microprocessor 301, a random access memory (RAM) module 302, a read-only memory (ROM) module 303, a memory or data storage module 304, a database 305, one or more input/output (I/O) devices 306, and an interface 307. Alternatively and/or additionally, network device 101 may include one or more software media components such as, for example, a computer-readable medium including computer-executable instructions for performing methods consistent with certain disclosed embodiments. It is contemplated that one or more of the hardware components listed above may be implemented using software. For example, storage 304 may include a software partition associated with one or more other hardware components of network device 101. Network device 101 may include additional, fewer, and/or different components than those listed above. It is understood that the components listed above are exemplary only and not intended to be limiting.

CPU 301 may include one or more processors, each configured to execute instructions and process data to perform one or more functions associated with network device 101. As illustrated in FIG. 3, CPU 301 may be communicatively coupled to RAM 302, ROM 303, storage 304, database 305, I/O devices 306, and interface 307. CPU 301 may be configured to execute sequences of computer program instructions to perform various processes, which will be described in detail below. The computer program instructions may be loaded into RAM 302 for execution by CPU 301.

RAM 302 and ROM 303 may each include one or more devices for storing information associated with an operation of network device 101 and/or CPU 301. For example, ROM 303 may include a memory device configured to access and store information associated with network device 101, including one or more virtual queues and recirculation path queues associated with network device 101. RAM 302 may include a memory device for storing data associated with one or more operations of CPU 301. For example, ROM 303 may load instructions into RAM 302 for execution by CPU 301.

Storage 304 may include any type of mass storage device configured to store information that CPU 301 may need to perform processes consistent with the disclosed embodiments. For example, storage 304 may include one or more magnetic and/or optical disk devices, such as hard drives, CD-ROMs, DVD-ROMs, or any other type of mass media device. Alternatively or additionally, storage 304 may include flash memory mass media storage or other semiconductor-based storage medium.

Database 305 may include one or more software and/or hardware components that cooperate to store, organize, sort, filter, and/or arrange data used by network device 101 and/or CPU 301. CPU 301 may access the information stored in database 305 to in order to identify the port locations associated with packets addressed to incoming MAC addresses. It is contemplated that database 305 may store additional and/or different information than that listed above.

I/O devices 306 may include one or more components configured to communicate information with a component or user associated with simulation environment 100. For example, I/O devices 306 may include a console with an integrated keyboard and mouse to allow a user to input parameters associated with network device 101. I/O devices 306 may also include a display including a graphical user interface (GUI) for providing a network management console for network administrators to configure network device 101. I/O devices 306 may also include peripheral devices such as, for example, a printer for printing information associated with network device 101, a user-accessible disk drive (e.g., a USB port, a floppy, CD-ROM, or DVD-ROM drive, etc.) to allow a user to input data stored on a portable media device, a microphone, a speaker system, or any other suitable type of interface device. I/O devices may be configured to output network analysis results and traffic characteristics.

Interface 307 may include one or more components configured to transmit and receive data via a communication network, such as the Internet, a local area network, a workstation peer-to-peer network, a direct link network, a wireless network, or any other suitable communication platform. For example, interface 307 may include one or more modulators, demodulators, multiplexers, demultiplexers, network communication devices, wireless devices, antennas, modems, and any other type of device configured to enable data communication via a communication network. According to one embodiment, interface 307 may be coupled to or include wireless communication devices, such as a module or modules configured to transmit information wirelessly using Wi-Fi or Bluetooth wireless protocols.

Processes and methods consistent with the disclosed embodiments provide a flexible solution for ensuring that recirculation path traffic is allowed sufficient bandwidth, even during periods of peak ingress network traffic. More specifically, features consistent with the present disclosure provide a virtual queue and virtual scheduler that queues low priority ingress network traffic and recirculation path traffic based on a weighted share algorithm allows a network administrator to allocate a minimum bandwidth for recirculation path traffic. At the same time, in the event of a virtual queue reaching maximum capacity, low priority network traffic is dropped, rather than high priority or recirculation path traffic.

Figure 4:
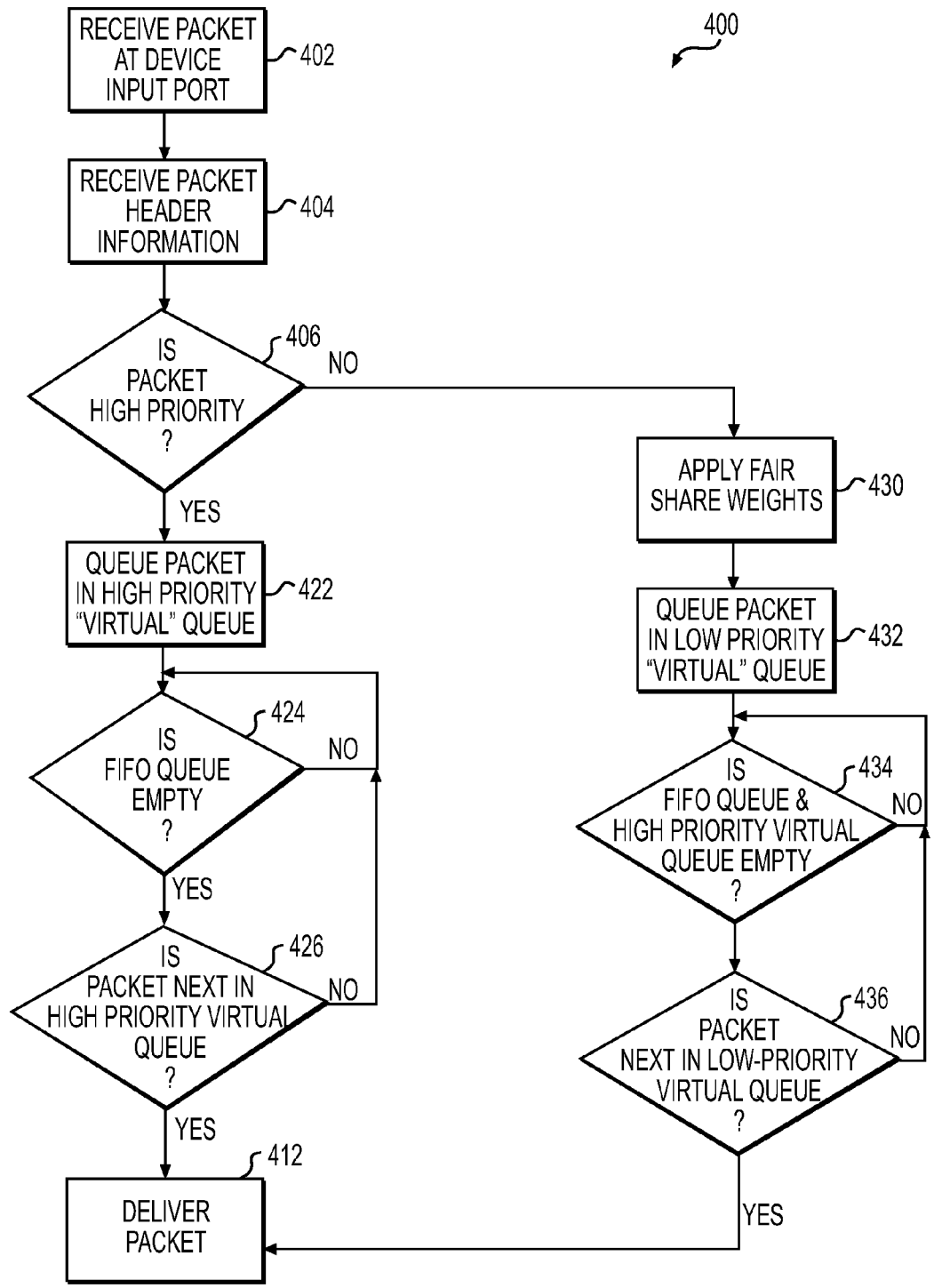
FIG. 4 is a flowchart depicting an exemplary method for strict priority scheduling between high priority and low priority network path traffic, consistent with certain disclosed embodiments.

FIG. 4 provides a flowchart 400 illustrating an exemplary strict priority scheduling process for high- and low-priority virtual queues. Strict priority, as the term is used herein, refers to a scheduling process whereby data is queued for transmission via an egress port of network device 101 based on the level of priority, such that high priority data is always given queue preference over low priority data. That is, low priority data is always delayed until all available high priority data has been queued for transmission. In contrast, weighted share scheduling schemes queue data for transmission based on assigned weights for the type of data (or the queue from which the data is drawn). According to one embodiment, a user or network administrator may define weights based on the percentage of bandwidth throughput desired for the type of data.

As shown in FIG. 4, the process commences upon receipt of a stream of packet data at an ingress port of network device 101 (Block 402). As the data is being received, network device 101 may be configured to monitor packet header information (Block 404). According to one embodiment, parser 206 of network device 101 may review L2/L3 packet header information of each packet of the income packet flow in order to determine a priority level associated with the packet. For example, some incoming packet data may be designated as "high-priority," meaning that it should be given processing priority over packets without such a designation (or that are otherwise designated as "low-priority).

Once the header information is reviewed, high priority packets may be identified (Block 406: Yes) and placed in high-priority virtual queue 222 (Block 422). Once in high-priority queue, a virtual strict priority scheduling module 240 may be configured to determine whether the physical FIFO queue 212 has sufficient space (block 424) to receive the next high-priority packet in the egress transmission queue. If virtual strict priority scheduler 240 determines that the physical FIFO queue 212 has sufficient space (block 424: Yes), strict priority scheduler 240 may identify the next high-priority packet in the virtual queue 222 (block 426: Yes) and queue the packet for delivery (block 412). If the physical FIFO queue does not have sufficient availability (block 424: No) or the packet is not next in the queue (block 426: No), strict priority scheduler 240 may return to block 424 to continue to analyze the FIFO queue availability.

If an incoming packet is identified as a low priority packet (or, at minimum, less than high priority) (block 406: No), virtual weighted fair share scheduler 250 may apply a fair share weight to the packet (block 430) and queue that packet in the low priority virtual queue (block 434). Once in low-priority queue, a virtual strict priority scheduling module 240 may be configured to determine whether the physical FIFO queue 212 and high-priority virtual queue 222 have sufficient space (block 434) to receive the next low-priority packet in egress transmission queue. If virtual strict priority scheduler 240 determines that the physical FIFO queue 212 and high-priority virtual queue 222 have sufficient space (block 434: Yes), strict priority scheduler 240 may identify the next low-priority packet in the virtual queue 224 (block 436: Yes) and queue the packet for delivery (block 412). If the physical FIFO queue 212 and high-priority virtual queue 222 do not have sufficient availability (block 434: No) or the packet is not next in the queue (block 436: No), strict priority scheduler 240 may return to block 434 to continue to analyze the FIFO queue availability.

Figure 5:
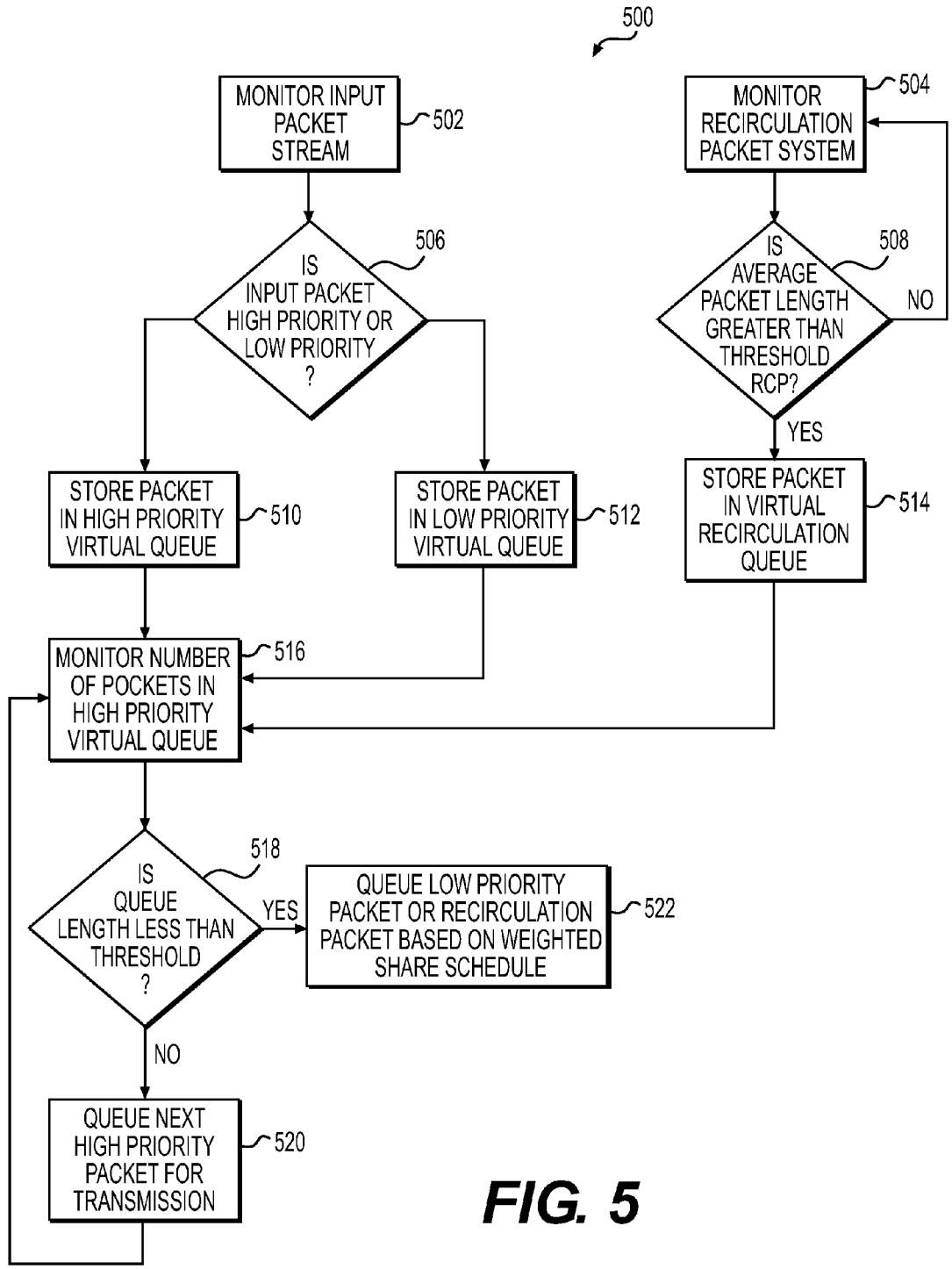
FIG. 5 is a flowchart depicting an exemplary method for flexible bandwidth scheduling between low priority ingress traffic and recirculation path traffic, in accordance with certain disclosed embodiments.

FIG. 5 provides a flowchart 500 depicting an exemplary weighted fair share scheduling process for low-priority ingress network traffic and recirculation path traffic that may be performed by network device 101. The process involves monitoring an input packet stream (block 502) and a recirculation packet stream (block 504) by network device 101 and/or one or more of its constituent components. According to one embodiment, the input packet stream 202 may be monitored by packet parser 206 and the recirculation packet stream 204 may be monitored by a packet length monitor 208.

Packet parser 206 may be configured to sort high and low priority packets (block 506) and store high priority packets in a high priority packet queue 222 (block 510) and low priority packets in a low priority virtual queue 224 (block 512). Packet length monitor 208 may be configured to determine whether the average packet length is greater than a threshold RCP value (block 508). If the average packet length is greater than the threshold RCP value (block 508: Yes), packet length monitor 208 may store the recirculation packet in a virtual recirculation queue 226 (block 514).

Strict priority scheduler 240 may be configured to monitor the number of packets (or length) of the high-priority virtual queue 516). If strict priority scheduler 240 determines that the number of packets or length of the high-priority virtual queue is less than a threshold (indicating that there is bandwidth available for low priority or recirculation packets traffic) (block 518: Yes), strict priority scheduler may queue one or more of low priority packet or recirculation packet traffic based on a weighted chare schedule (block 522). As explained, weighted share scheduling schemes queue data for transmission based on assigned weights for the type of data (or the queue from which the data is drawn). According to one embodiment, a user or network administrator may define weights based on the percentage of bandwidth throughput desired for each of low priority and recirculation path traffic.

If, on the other hand, strict priority scheduler 240 determines that the number of packets or length of the high-priority virtual queue is greater than the threshold (indicating that there is high priority packets that need to be transmitted before for low priority or recirculation packets traffic) (block 518; No), strict priority scheduler may queue the next high priority packet in the virtual high-priority packet queue for transmission (block 520).

It will be apparent to those skilled in the art that various modifications and variations can be made to the disclosed systems and associated methods for flexible bandwidth management between ingress network port traffic and recirculation path traffic. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for managing recirculation path traffic and ingress port traffic to flexibly manage bandwidth therebetween in a network node, the method comprising:
monitoring an input packet stream received at an input port of the network node and a recirculation packet stream at a recirculation path of the network node;
directing, via a first scheduler, the input packet stream and the recirculation packet stream over a first set of one or more traffic paths, to a physical FIFO queue that is coupled to egress network ports of the network node, wherein the physical FIFO queue is coupled, via a second set of one or more traffic paths, to one or more virtual queues that direct the recirculation packet stream to the physical FIFO queue via a second scheduler;
detecting, over the second set of one or more traffic paths, a priority level associated with individual packets of the monitored input packet stream;
in response to detecting a low priority level for one or more given packets of the individual packets, storing the one or more given packets as low priority packets in a virtual queue of the one or more virtual queues, the virtual queue being associated with a memory of the network node;
determining, over the second set of one or more traffic paths, an average packet length associated with packets of the monitored recirculation packet stream; and
queuing, via the second scheduler, over the second set of one or more traffic paths, one or more of i) the low priority packets from the virtual queue and ii) recirculation packets of the monitored recirculation packet stream for transmission, the queuing based on the determined average packet length and a weighted share schedule that maintains a minimum throughput for the recirculation packets.

2. The method of claim 1, further comprising:
in response to detecting a high priority level for one or more given packets of the individual packets, storing the one or more given packets as high priority packets in a second virtual queue, the second virtual queue being associated with the memory of the network node;
wherein the low priority packets and the recirculation packets are queued by the second scheduler for transmission when the second virtual queue associated with the high priority packets is empty.

3. The method of claim 1, further comprising:
in response to detecting a high priority level for one or more given packets of the individual packets, storing the one or more given packets as high priority packets in a second virtual queue, the second virtual queue being associated with the memory of the network node;
wherein the low priority packets and the recirculation packets are queued by the second scheduler when the second virtual queue associated with the high priority packets is below a threshold queue length.

4. The method of claim 3, further comprising adjusting, via the second scheduler, a weight parameter associated with the weighted share schedule based on a number of high priority packets stored in the second virtual queue.

5. The method of claim 3, further comprising storing the recirculation packets in a virtual recirculation queue based on a determination that the determined average packet length exceeds a threshold recirculation packet length.

6. The method of claim 5, further comprising dropping one or more low priority packets from the virtual queue based on one or more determinations selected from the group of: a determination that the virtual queue exceeds a threshold queue length associated with the virtual queue, a determination that the second virtual queue exceeds a threshold queue length associated with the second virtual queue, and a determination that the virtual recirculation queue exceeds a threshold queue length associated with the virtual recirculation queue.

7. A network switch device, comprising:
an input port for receiving an input packet stream;
a recirculation path for conveying a recirculation packet stream;

a memory module coupled to the input port and the recirculation path, the memory module comprising a high-priority virtual queue, a low-priority virtual queue, and a virtual recirculation queue for storing respective high-priority, low-priority, and recirculation packets;

a processor, communicatively coupled to the memory module, the input port, and the recirculation path, the memory having instructions stored thereon, wherein executed of the instructions, cause the processor to:

monitor the input packet stream and the recirculation packet stream;

direct, via a first scheduler, the input packet stream and the recirculation packet stream over a first set of one or more traffic paths, to a physical FIFO queue that is coupled to egress network ports of the network switch device, wherein the physical FIFO queue is coupled, via a second set of one or more traffic paths, one or more virtual queues that direct the recirculation packet stream to the physical FIFO queue via a second scheduler;

detect, over the second set of one or more traffic paths, a priority level associated with individual packets of the monitored input packet stream;

in response to detecting a low priority level for one or more given packets of the individual packets, store the one or more given packets as low priority packets in the low-priority virtual queue;

determine, over the second set of one or more traffic paths, an average packet length associated with packets of the monitored recirculation packet stream; and queue, via the second scheduler, over the second set of one or more traffic paths, one or more of i) the low priority packets from the low-priority virtual queue and ii) recirculation packets of the monitored recirculation packet stream for transmission based on the determined average packet length and a weighted share schedule that maintains a minimum throughput for the recirculation packets.

8. The network switch device of claim 7, wherein the instructions, when executed by the processor, further cause the processor to:

in response to detecting a high priority level for one or more given packets of the individual packets, store the one or more given packets as high priority packets in the high-priority virtual queue;

wherein the one or more low priority packets and recirculation packets are queued by the second scheduler for transmission when the high priority virtual queue is empty.

9. The network switch device of claim 7, wherein the instructions, when executed by the processor, further cause the processor to:

in response to detecting a high priority level for one or more given packets of the individual packets, store the one or more given packets as high priority packets in the high priority virtual queue;

wherein the one or more low priority packets and the recirculation packets are queued by the second scheduler when the high priority virtual queue is below a threshold queue length.

10. The network switch device of claim 9, wherein the instructions, when executed by the processor, further cause the processor to adjust, via the second scheduler, a weight parameter associated with the weighted share schedule based on a number of high priority packets stored in the high priority virtual queue.

11. The network switch device of claim 9, wherein the instructions, when executed by the processor, further cause the processor to store the recirculation packets in a virtual recirculation queue based on a determination that the determined average packet length exceeds a threshold recirculation packet length.

12. The network switch device of claim 11, wherein the instructions, when executed by the processor, further cause the processor to drop low priority packets from the one or more virtual queues based on one or more determinations selected from the group of: a determination that one or more of the virtual queue exceed a threshold queue length associated with the virtual queue, a determination that the high priority virtual queue exceed a threshold queue length associated with the high priority virtual queue, and a determination that the virtual recirculation queue exceeds a threshold queue length associated with the virtual recirculation queue.

13. A non-transitory computer-readable medium for use on a computer system, the computer-readable medium including computer-executable instructions, wherein execution of the instructions, cause the computer system to:

monitor, at an input port of the computer system, an input packet stream;

monitor, at a recirculation path of the computer system, a recirculation packet stream;

direct, via a first scheduler, the input packet stream and the recirculation packet stream over a first set of one or more traffic paths, to a physical FIFO queue that is coupled to egress network ports of the computer system, wherein the physical FIFO queue is coupled, via a second set of one or more traffic paths, to one or more virtual queues that direct the recirculation packet stream to the physical FIFO queue via a second scheduler;

detect, over the second set of one or more traffic paths, a priority level associated with individual packets of the monitored input packet stream;

in response to detecting a low priority level for one or more given packets of the individual packets, store the one or more given packets as low priority packets in a virtual queue of the one or more virtual queues;

determine, over the second one or more traffic paths, an average packet length associated with packets of the monitored recirculation packet stream; and queue, via the second scheduler, over the second one or more traffic paths, one or more of i) the low priority packets from the virtual queue and ii) recirculation packets of the monitored recirculation packet stream for transmission, the queue being based on the determined average packet length and a weighted share schedule that maintains a minimum throughput for the recirculation packets.

14. The computer-readable medium of claim 13, wherein the instructions, when executed by the computer system, further cause the computer system to:

in response to detecting a high priority level for one or more given packets of the individual packets, store the one or more given packets as high priority packets in a second virtual queue;

wherein the low priority packets and the recirculation packets are queued by the second scheduler for transmission when the second virtual queue is empty.

15. The computer-readable medium of claim 13, wherein the instructions, when executed by the computer system, further cause the computer system to:
in response to detecting a high priority level for one or more given packets of the individual packets, store the one or more given packets as high priority packets in a second virtual queue;
wherein the priority packets and the recirculation packets are queued by the second scheduler when the second virtual queue is below a threshold queue length.

16. The computer-readable medium of claim 15, wherein the instructions, when executed by the computer system, further cause the computer system to adjust, via the second scheduler, a weight parameter associated with the weighted share schedule based on a number of high priority packets stored in the second virtual queue.

17. The computer-readable medium of claim 15, wherein the instructions, when executed by the computer system, further cause the computer system to store the recirculation packets in a virtual recirculation queue based on a determination that the determined average packet length exceeds a threshold recirculation packet length.

18. The computer-readable medium of claim 17, wherein the instructions, when executed by the computer system, further cause the computer system to drop low priority packets from the virtual queue based on one or more determinations selected from the group of: a determination that one or more of the virtual queue exceeds a threshold queue length associated with the virtual queue, a determination that the second virtual queue exceeds a threshold queue length associated with the second virtual queue, and a determination that the virtual recirculation queue exceeds a threshold queue length associated with the virtual recirculation queue.

* * * * *